(12) United States Patent
Chengalvala et al.

(10) Patent No.: US 11,196,560 B2
(45) Date of Patent: Dec. 7, 2021

(54) POLICY AND TOKEN BASED AUTHORIZATION FRAMEWORK FOR CONNECTIVITY

(71) Applicant: Ford Global Technologies, LLC, Dearborn, MI (US)

(72) Inventors: Venkata Maruthe Ravikumara Sharma Chengalvala, Troy, MI (US); Praveen Kumar Yalavarty, Novi, MI (US); John Correia, Berkley, MI (US); Rajesh Balaji Vijayan, Plymouth, MI (US); Edward Charles Esker, Dearborn, MI (US); Michael Raymond Westra, Plymouth, MI (US); Leonie Tessa Tielert, Munich (DE)

(73) Assignee: Ford Global Technologies, LLC, Dearborn, MI (US)

(*) Notice: Subject to any disclaimer, the term of this patent is extended or adjusted under 35 U.S.C. 154(b) by 340 days.

(21) Appl. No.: 16/227,441

(22) Filed: Dec. 20, 2018

(65) Prior Publication Data
US 2020/0204371 A1    Jun. 25, 2020

(51) Int. Cl.
*H04L 29/06* (2006.01)
*H04L 9/32* (2006.01)
*H04L 29/08* (2006.01)

(52) U.S. Cl.
CPC ............ *H04L 9/3213* (2013.01); *H04L 63/10* (2013.01); *H04L 63/12* (2013.01); *H04L 63/20* (2013.01); *H04L 67/28* (2013.01); *H04L 67/12* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 8,750,123 B1 * | 6/2014 | Alisawi | H04W 52/0219 370/235 |
| 9,065,765 B2 * | 6/2015 | Alisawi | H04L 67/28 |
| 2007/0087756 A1 * | 4/2007 | Hoffberg | G06Q 20/40 455/450 |
| 2014/0357295 A1 * | 12/2014 | Skomra | H04W 12/069 455/456.1 |
| 2016/0306966 A1 * | 10/2016 | Srivastava | H04L 9/30 |
| 2017/0262659 A1 | 9/2017 | Kuris | |

(Continued)

OTHER PUBLICATIONS

Hussain, Rasheed et al. Secure and Privacy-Aware Incentives-Based Witness Service in Social Internet of Vehicles Clouds. IEEE Internet of Things Journal, vol. 5, Issue: 4. https://ieeexplore.ieee.org/stamp/stamp.jsp?tp=&arnumber=8383974 (Year: 2018).*

(Continued)

*Primary Examiner* — Jeremiah L Avery
(74) *Attorney, Agent, or Firm* — Michael Spenner; Brooks Kushman P.C.

(57) ABSTRACT

A system including one or more servers, programmed to responsive to receiving a token request from a vehicle to access content stored in a content cloud, validate the token request against pre-defined policies; responsive to a successful policy validation, verify token generating responsibility based on a validation result and pre-defined rules; and responsive to verifying the system has the token generating responsibility, generate a token for the token request.

13 Claims, 6 Drawing Sheets

(56) References Cited

U.S. PATENT DOCUMENTS

2018/0072190 A1  3/2018  Kowalski et al.
2018/0276674 A1* 9/2018  Ramatchandirane ... H04W 4/40
2018/0307859 A1* 10/2018 LaFever ................ G16H 10/60
2019/0092279 A1* 3/2019  Jarvis .................... G06Q 20/00

OTHER PUBLICATIONS

Gao, Wei et al. Threshold-Based Secure and Privacy-Preserving Message Verification in VANETs. 2014 IEEE 13th International Conference on Trust, Security and Privacy in Computing and Communications. https://ieeexplore.ieee.org/stamp/stamp.jsp?tp=&arnumber=7011329 (Year: 2014).*

Jiang, Qi et al. Integrated Authentication and Key Agreement Framework for Vehicular Cloud Computing. IEEE Network vol. 32, Issue: 3. https://ieeexplore.ieee.org/stamp/stamp.jsp?tp=&arnumber=8370875 (Year: 2018).*

* cited by examiner

POLICY AND TOKEN BASED AUTHORIZATION FRAMEWORK FOR CONNECTIVITY

TECHNICAL FIELD

The present disclosure is generally related to a vehicle connectivity authorization system. More specifically, the present disclosure is related to a policy and token-based authorization system for vehicle connectivity.

BACKGROUND

Many vehicles are provided with wireless connectivity features allowing the vehicles to access remote contents. For instance, a telematics control unit (TCU) may be used to connect a vehicle with a cloud via a wireless network. An electronic control unit (ECU) may request to access digital content from a remote server via the TCU. For security reasons, various authorizations may be required before the ECU can access the digital content stored on the server, increasing the communication latency and complexity.

SUMMARY

In one or more illustrative embodiment of the present disclosure, a system including one or more servers, programmed to responsive to receiving a token request from a vehicle to access content stored in a content cloud, validate the token request against pre-defined policies; responsive to a successful policy validation, verify token generating responsibility based on a validation result and pre-defined rules; and responsive to verifying the system has the token generating responsibility, generate a token for the token request.

In one or more illustrative embodiment of the present disclosure, a vehicle including a controller, programmed to responsive to detecting a token request from an electronic control unit (ECU) requesting to access a content in a cloud, validate meta information of the token request; responsive to a successful meta information validation, validate the token request against in-vehicle policies; responsive to a successful in-vehicle policy validation, send the token request to the cloud via a telematics control unit (TCU); responsive to receiving a token from the cloud, validate the token and store an expiration time stamp of the token; and establish a connection to the cloud to access the content, wherein the token is generated by a manufacturer server configured to validate the token request against pre-defined policies, verify token generating responsibility based on a validation result and pre-defined rules, and responsive to verifying the manufacturer server has the token generating responsibility, generate a token for the token request.

In one or more illustrative embodiment of the present disclosure, a method for a server including responsive to receiving a token request from a vehicle via a token manager to access a content stored in a content server, validating the token request against pre-defined cloud policies via a policy manager; responsive to a successful cloud policy validation from the policy manager, verifying token generating responsibility based on a cloud policy validation result and pre-defined rules via the token manager; and responsive to verifying the generating responsibility belongs to the content server, sending the token request to the content server via an application program interface (API) manager.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle connectivity authorization system. More specifically, the present disclosure proposes a policy and token-based authorization system for vehicle connectivity.

Figure 1:
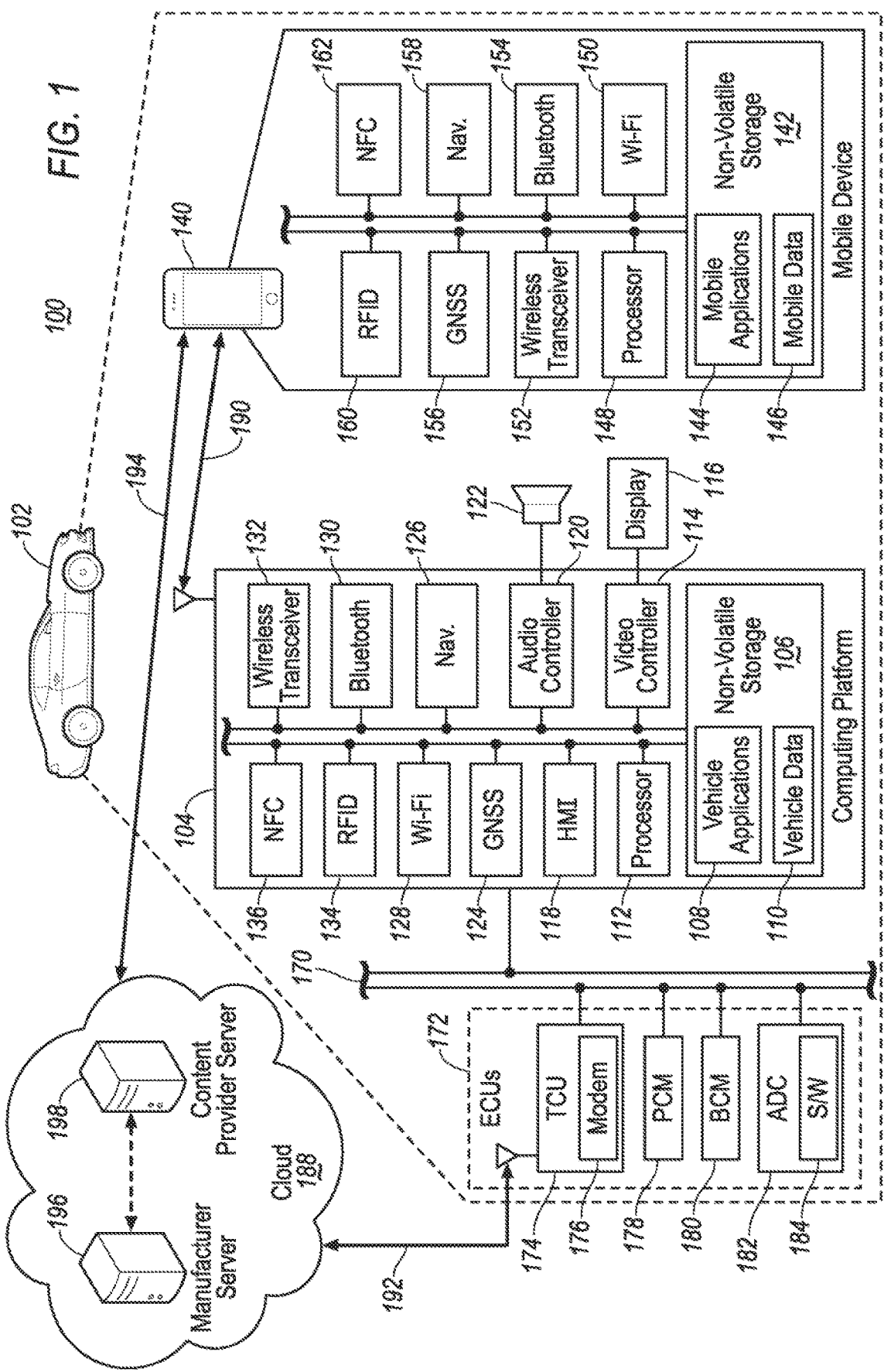
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and navigation instructions via the speaker 122 and/or the display 116. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 116 as one of the vehicle applications 108.

The computing platform 104 may be configured to wirelessly communicate with a mobile device 140 of the vehicle users/occupants via a wireless connection 190. The mobile device 140 may be any of various types of portable computing device, such as cellular phones, tablet computers, wearable devices, smart watches, laptop computers, portable music players, or other device capable of communication with the computing platform 104. The wireless transceiver 132 may be in communication with a Wi-Fi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GNSS controller 156. The mobile device 140 may be provided with a wireless transceiver 152 in communication with a Wi-Fi controller 150, a Bluetooth controller 154, a RFID controller 160, a NFC controller 162, and other controllers (not shown), configured to communicate with the wireless transceiver 132 of the computing platform 104.

The computing platform 104 may be further configured to communicate various electronic control units (ECUs) 172 via one or more in-vehicle network 170. The in-vehicle network 170 may include, but is not limited to, one or more of a controller area network (CAN), an Ethernet network, and a media-oriented system transport (MOST), as some examples.

The ECUs 172 may include a TCU 174 configured to control telecommunication between vehicle 102 and a cloud 188 through a wireless connection 192 using a modem 176. Additionally or alternatively, the computing platform 104 may be configured to communicate with the cloud 188 via the mobile device 140 through a wireless connection 194. The cloud 188 may include one or more servers, or computers connected via various types of wired or wireless networks. It is noted that the term cloud is used as a general term throughout the present disclosure and may refer to any cloud-based services involving multiple servers, computers, devices and the like. As an example, the cloud 188 may include one or more manufacturer severs 196 configured to monitor and control the connectivity of the TCU 174 with the cloud 188. The cloud may further include one or more content provider servers 198 configured to provide digital data content to various components (e.g. ECUs 172) of the vehicle 102.

The ECUs 172 may include various controllers configured to monitor and operate various feature of the vehicle 102. As a few non-limiting examples, the ECUs 172 may further include a powertrain control module (PCM) 178 configured to monitor and control the powertrain operation of the vehicle 102. For instance, the PCM 178 may be configured to the stop/start of an engine (not shown), and/or the driving mode (e.g. economic, normal, or sport) of the vehicle 102 via software and instructions stored in an internal storage (not shown) of the PCM 178. The ECUs 172 may further include a body control module (BCM) 180 configured to monitor and control body operations of the vehicle 102. For instance, the BCM 180 may be configured to control and monitor body functions such as door lock/unlock, seatbelt warning, blind spot monitoring or the like. Software used to control the operation of the BCM 180 may be stored in an internal storage (not shown) of the BCM 180. The ECUs 152 may further include an autonomous driving controller (ADC) 160 configured to monitor and control the autonomous driving features of the vehicle 102 via software 184 stored in an internal storage. Some autonomous driving feature may include lane keep assist, safe distance from other vehicles, cruise control, hands-off-wheel alert, autobraking, brake mitigation with multiple sensitivity levels or the like.

The software used by various ECUs 172 may be updatable from the cloud 188. For instance, responsive to detecting a newer version of ADC software 184, the ADC 182 may initiate a connection request to a content provider server 198 to download the software. For security reasons, the computing platform 104 may be used to monitor and control the communication between the ADC 182 and the cloud 188 via the TCU 174. For instance, the computing platform 104 may be implemented as an enhanced central gateway (ECG) and/or a wireless interface router (WIR) using software e.g. as one of the vehicle applications 108 configured to validate the connection request and response to and from the cloud 188. Alternatively, the ECG/WIR may be implemented via the TCU 174, or an individual ECG/WIR module (not shown) as one of the ECUs 172.

Figure 2A:
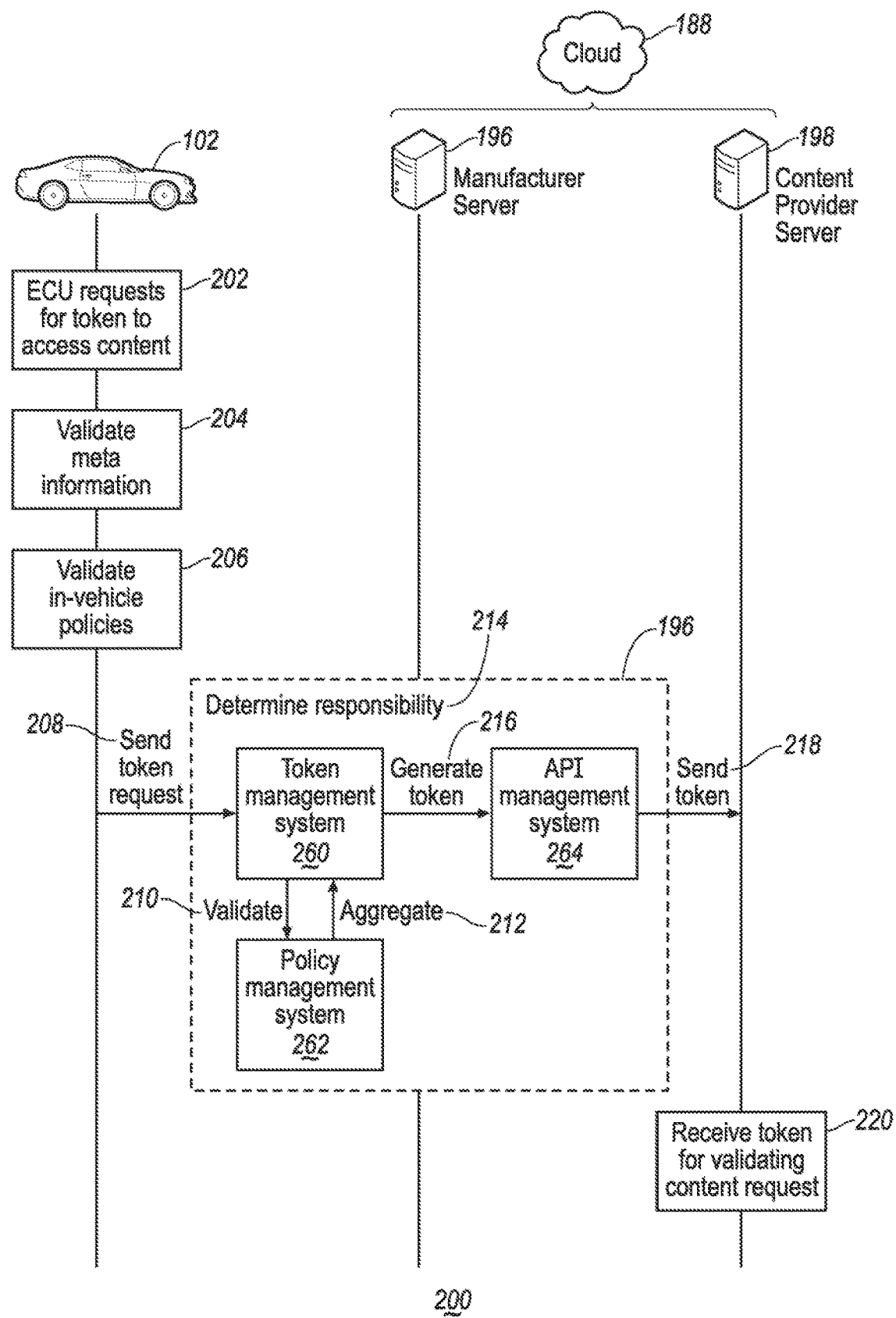
FIGS. 2A and 2B illustrate an example data flow diagram for a process of a vehicle connection system of one embodiment of the present disclosure.
Figure 2B:
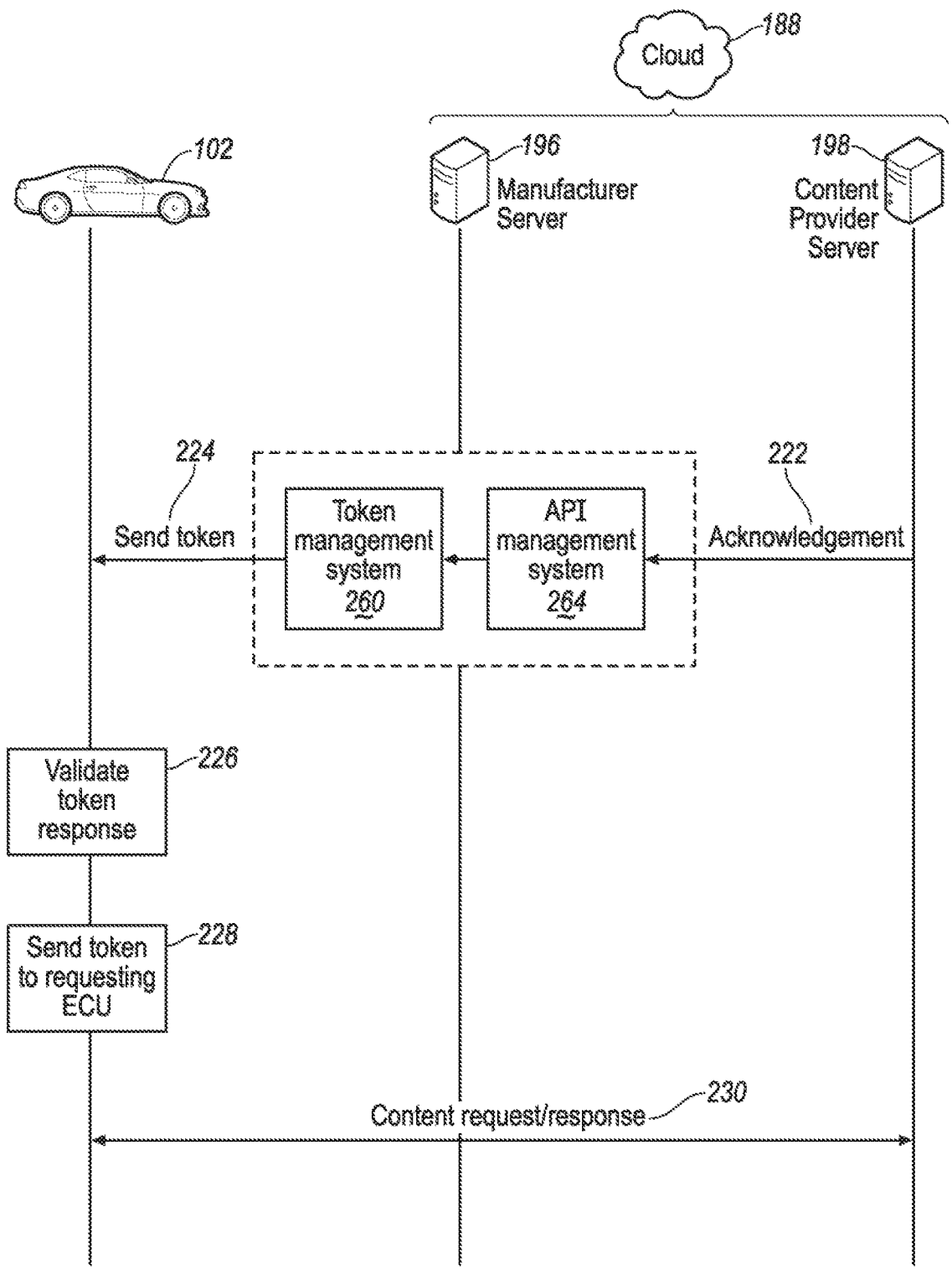

Referring to FIG. 2, a data flow diagram for a process 200 of a vehicle connection system of one embodiment of the present disclosure is illustrated. The process 200 is generally related to a vehicle ECU 172 requesting a security token from a manufacturer server 196 to access digital content from a content provider server 198. With continuing reference to FIG. 1, at operation 202 a ECU 172 of the vehicle 102 generates a request for a security token to access a content stored somewhere in the cloud 188. Depending on the configuration of the vehicle system 102 and/or the cloud 188, the security token may be of various types and include various information. For instance, the security token may be an ECG/WIR token allowing the ECU 172 to access the content. The token request generated by the ECU 172 may include various meta information such as an application identification requesting for the content, an ECU identification, a proxy request or the like.

Responsive to receiving the token request from the ECU 172, at operation 204, the computing platform 104 validates the meta information contained in the token request. Responsive to a successful validation of the meta information, at operation 206, the computing platform 104 further validates the token request based on pre-defined in-vehicle policies to determine whether the request is valid. For instance, the in-vehicle policies may be stored in the storage 106 and involves various aspects of ECU 172 access to digital contents such as a timeframe the ECU 172 is allowed to connect to the cloud, data plan package, vehicle task priority or the like. Responsive to a successful validation against the in-vehicle policies, at operation 208 the computing platform 104 sends the token request to the manufacturer server 196 via the TCU 174 to request to generate a security token to connect.

The manufacturer server 196 may include one or more computer server devices associated with a manufacturer of the vehicle 102, a manufacturer of the requesting ECU 172, a software developer of the requesting ECU software, and/or any party authorized to control the communication between the vehicle 102 and the content provider server 198. The manufacturer server 196 may be sub-divided into multiple sub-systems including a token management system 260 configured to generate security tokens, a policy management system 262 configured to manage cloud policies, and an application program interface (API) management system 264 configured to interface with the content provider server 198. The multiple sub-systems may be implemented via software applications and share the same hardware structure. For instance, responsive to receiving the token request from the vehicle 102 via the token management system 260, at operation 210, the manufacturer server 196 validates the token request against cloud-based policies via the policy management system 262. Similar to the in-vehicle policies, the manufacturer server 196 may be configured with various policies for data communication. As a few non-limiting examples, the policy management system 262 may validate the token request against a connected vehicle feature management application (CVFMA) administrating the scope of the connected features of vehicles (including the vehicle 102), subscription management, customer connectivity settings, and/or various general or specific business rules (e.g. feature implementation (FI) specific business rules managing specific connection features) to determine if the token request should proceed and be granted. Responsive to a successful cloud-based policies validation, at operation 212, the policy management system 262 aggregates the validation response to generate an aggregated policy validation result to send back to the token management system 260.

With the aggregated policy validation result received from the policy management system 262, at operation 214, the token management system 260 determines a token generation responsibility based on the aggregated policy validation result. For instance, the token request may have already been verified against a pre-defined business rule specifying whether it is sufficient for the manufacturer server 196 to generate the security token or the requested content provider server 198 requires something else. In the example illustrated in the process 200, the token management system 260 determines the security token is to be generated by the manufacturer server 196. Responsive to such determination, the token management system 260 generates the security token at operation 216. The security token may include authorization to the content requesting ECU 172 to access the content provider server 198 for a particular feature/content. Each token generated may have a time to live (TTL) based on a pre-defined security risk categorization of the feature requested. For instance, a security token for ECU updates may have a shorter TTL (e.g. a few minutes) as compared a security token for online entertainment media access (e.g. a few hours). Depending on the feature requested, the security token may be reusable during the TTL. Or alternatively, the security may configured to be single use only and may only be used one during the TTL. At operation 218, the manufacturer server 196 sends the security token to the content provider server 198 via the API management system 264. The content provider server 198 may include one or more servers or computing/storage devices associated with or independent from the manufacturer server 196. For instance, the content provider server 198 may be integrated with the manufacturer server 196. Alternatively, the content provider server 198 may be operated by a third party located away and independent from the vehicle manufacturer or the ECU manufacturer, configured to provide digital content free-of-charge or on a subscription basis.

Responsive to receiving the security token, the content provider server 198 stores the token for validating content requests purposes at operation 220, and sends a token acknowledgement to the token management system 206 via the API management system 264 at operation 222. At operation 224, the token management system 260 sends the security token generated at operation 214 to the vehicle 102 for responsive validation. Responsive to receiving the security token, at operation 226, the computing platform 104 validates the security token and stores the security token following a successful validation. At operation 228, the computing platform 104 sends the security token along with the connection address (e.g. Internet protocol (IP) address) to be used to establishing the connection to the content requesting ECU 172. The connection address may be contained in the security token or sent separately. At operation 230, a connection is established between the content requesting ECU 172 and the content provider server 198 using the security token.

The security token may be reused during the TTL of the token. For instance, the token may be cached locally by the requesting ECU 172, or alternatively, stored in the vehicle storage (e.g. the storage 106) during the TTL. In this way, the communication latency between the vehicle 102 and the cloud 188 may be reduced. In addition, the token management system 260 may revoke the security token at any time for security reasons. In case that the token is generated elsewhere, the token generating entity may revoke the token. A revocation message may be sent to the vehicle 102.

The operations of process 200 may be applied to various situations. The process may be initiated by one of the ECUs 172 automatically requests to download digital content from the cloud 188. Alternatively, the ECU 172 may initiate the token request responsive to a user input via the HMI 118. For instance, a user of the vehicle 102 may input to the computing platform 104 via the HMI 118 to instruct the ADC 184 to download the latest version software 184 from the cloud 188. As another example, the navigation controller 126 may request to access live traffic data from the cloud 188 responsive to a user input to the navigation feature. The token needed to connect to the content provider server may be ECG/WIR token and the computing platform 104 may operate as an ECG/WIR to validate the token request from the requesting ECU 172. Following the above ADC 182 requesting for software update example, the computing platform 104 serving as an ECG/WIR may validate the request against pre-defined in-vehicle policies e.g. stored in the storage 106. Responsive to a successful validation, the computing platform 104 may send the token request to the pre-defined manufacturer server 196 for token validation via the TCU 174. Additionally or alternatively, the token request may be sent to the manufacturer server 196 via the mobile device 140 through the wireless connection 194.

As discussed above, the manufacturer server 196 may be sub-divided into multiple sub-systems. The multiple sub-system may be implemented via software applications and share the same hardware structure. Alternatively, the multiple sub-systems may be structurally independent from each other and connected via wired and/or wireless connections. The token management system 260 of the manufacturer server 196 may be configured to communicate with the vehicle 102 and the API management system 264 may be configured to communicate with the content provider server 198. Responsive to receiving the token request from the vehicle 102, the token management system 260 may send the request to the policy management system 262 for validation against various cloud policies. The policy management system 262 generates an aggregated validation result responsive to a successful validation. Next, the token management system 260 may decide if a security token generated by the manufacturer server 196 will be sufficient for the requesting ADC 182 to access the software update from the content provider server. For instance, if the ADC software 184 is developed by the vehicle manufacturer, or the vehicle manufacturer is authorized by the content provider to generate the security token, the token management system 260 may be configured to generate the security token. Otherwise, in case that the content provider only accepts the security token generated locally by the content provider server 198 or other authorized parties, the token management system 260 may request those authorized servers/parties for the security token via the API management system 264.

Following the example illustrated in the process 200 in which the token management system 260 generates the security token and send the security token to the content provider server 198 via the API management system 264, the content provider server 198 may store the token and send an acknowledgement back to the manufacturer server 196. The token management system 260 may further send the security token to the vehicle 102 responsive to receiving the acknowledgement. Alternatively, the token management system 260 may send the security token to the vehicle 102 without waiting for the acknowledgement from the content provider server 198. The computing platform 104 provided with the ECG/WIR feature may store the security token in the storage 106 and an expiration time stamp received with the security token responsive to a successful ECG/WIR validation. Since both the vehicle 102 and the content provider server 198 are provided with the security token, the ADC 182 may send a content request using the security token via the TCU 174 and/or the mobile device 140. The content provider server 198 may send a content response to the vehicle 102 responsive to receiving the content request, and a data connection between the vehicle 102 and the content provider server 198 is established. In some cases, the manufacturer server 196 may serve as a proxy between the vehicle 102 and the content provider server 198 if necessary.

Figure 3A:
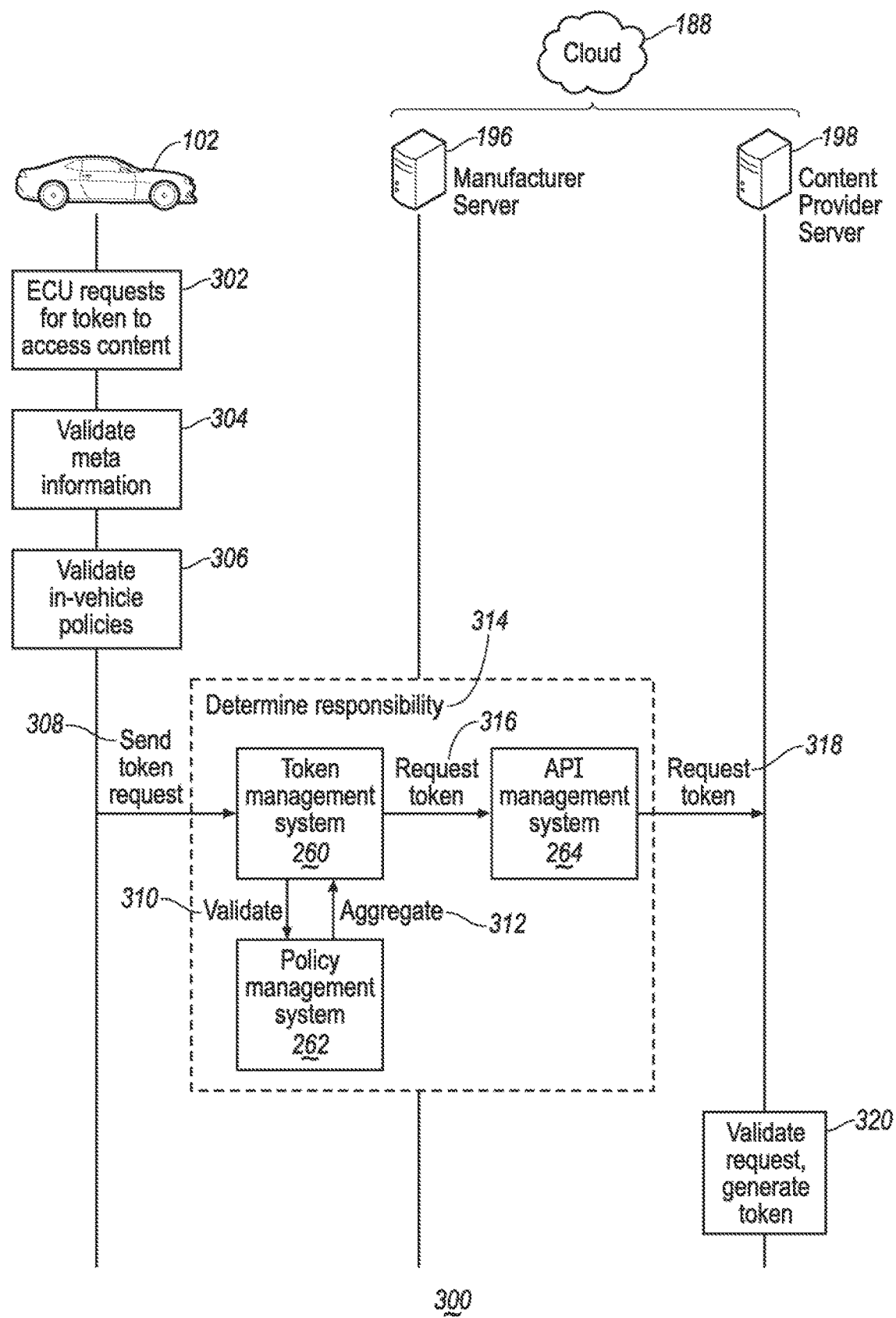
FIGS. 3A and 3B illustrate an example data flow diagram for a process of a vehicle connection system of another embodiment of the present disclosure.
Figure 3B:
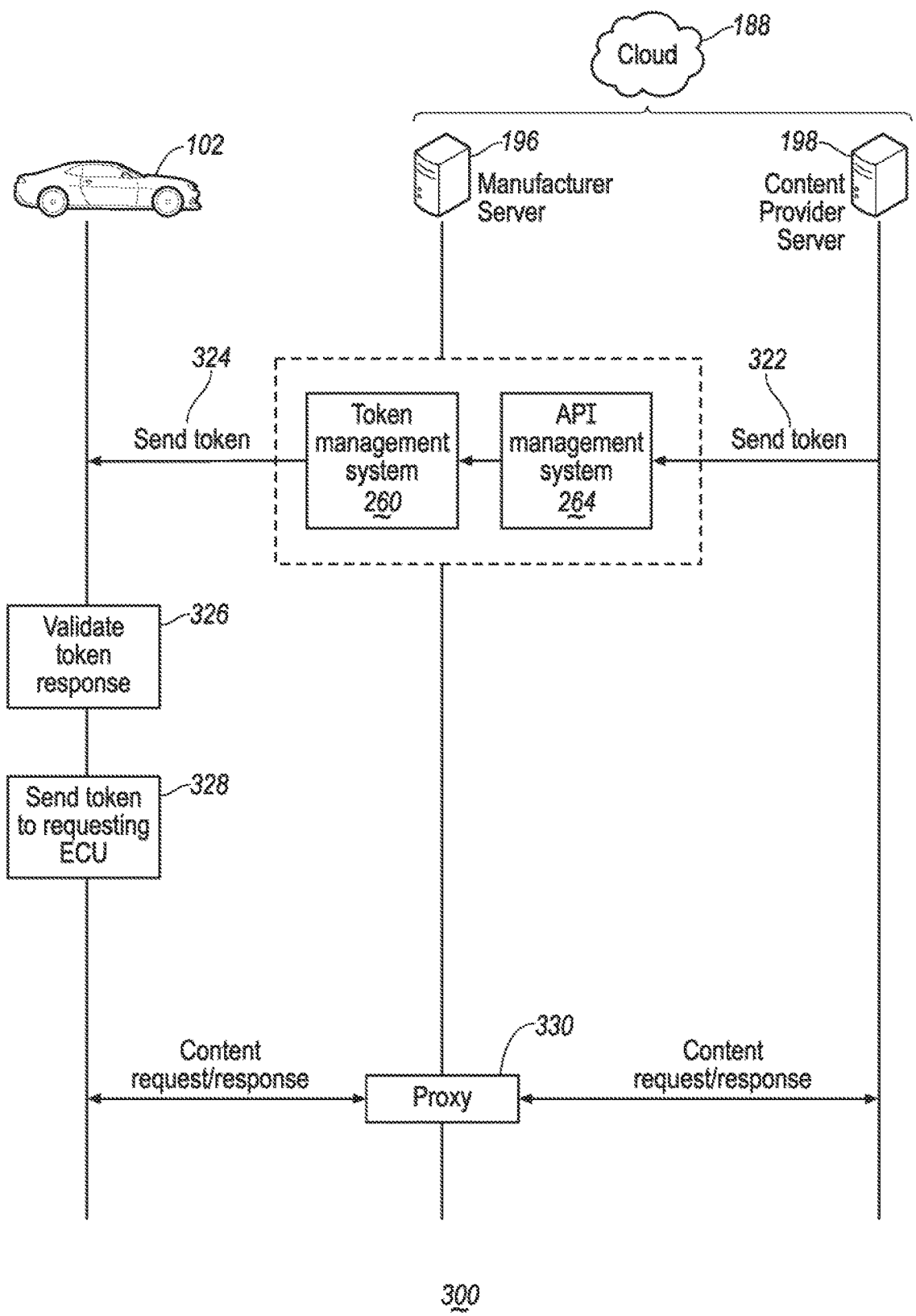

Referring to FIG. 3, a data flow diagram for a process 300 of a vehicle connection system of another embodiment of the present disclosure is illustrated. Compared with the process 200 as illustrated with reference to FIG. 2, the main difference of the present example is that the token is generated at the content provider server 198. Referring to the process 300, operations 302-312 is substantially the same as operation 202-212 of the process 200. At operation 314, the token management system 260 determines the token generation responsibility belongs to the content provider server 198 based on the aggregated policy validation result. In responsive, the token management system 260 sends the token request to the content provider server 198 via the API management system 264 at operations 316 and 318. The token request may be the same token request that the token management system 260 received from the vehicle 102. Alternatively, the token management system 206 may generates a new token request based on the original token request from the vehicle 102 to send to the content provider server 198.

Responsive to receiving the token request from the API management system 264, the content provider server 198 validates the token request and generates a security token responsive to a successful validation at operation 320. The security token may specify a time frame within which the token is valid, as well as the content that the requesting ECU 172 is authorized to access. At operation 322, the content provider server 198 sends the security token to the manufacturer server 196 via the API management system 264. At operation 324, the manufacturer server 196 forward the security token to the vehicle 102. Responsive to receiving the security token, at operation 326, the computing platform 104 validates the security token and stores the security token following a successful validation. At operation 328, the computing platform 104 sends the security token along with the IP address to be used to establishing the connection to the content requesting ECU 172. At operation 330, a connection is established between the content requesting ECU 172 and the content provider server 198 via the manufacturer server 196 as a proxy.

Figure 4:
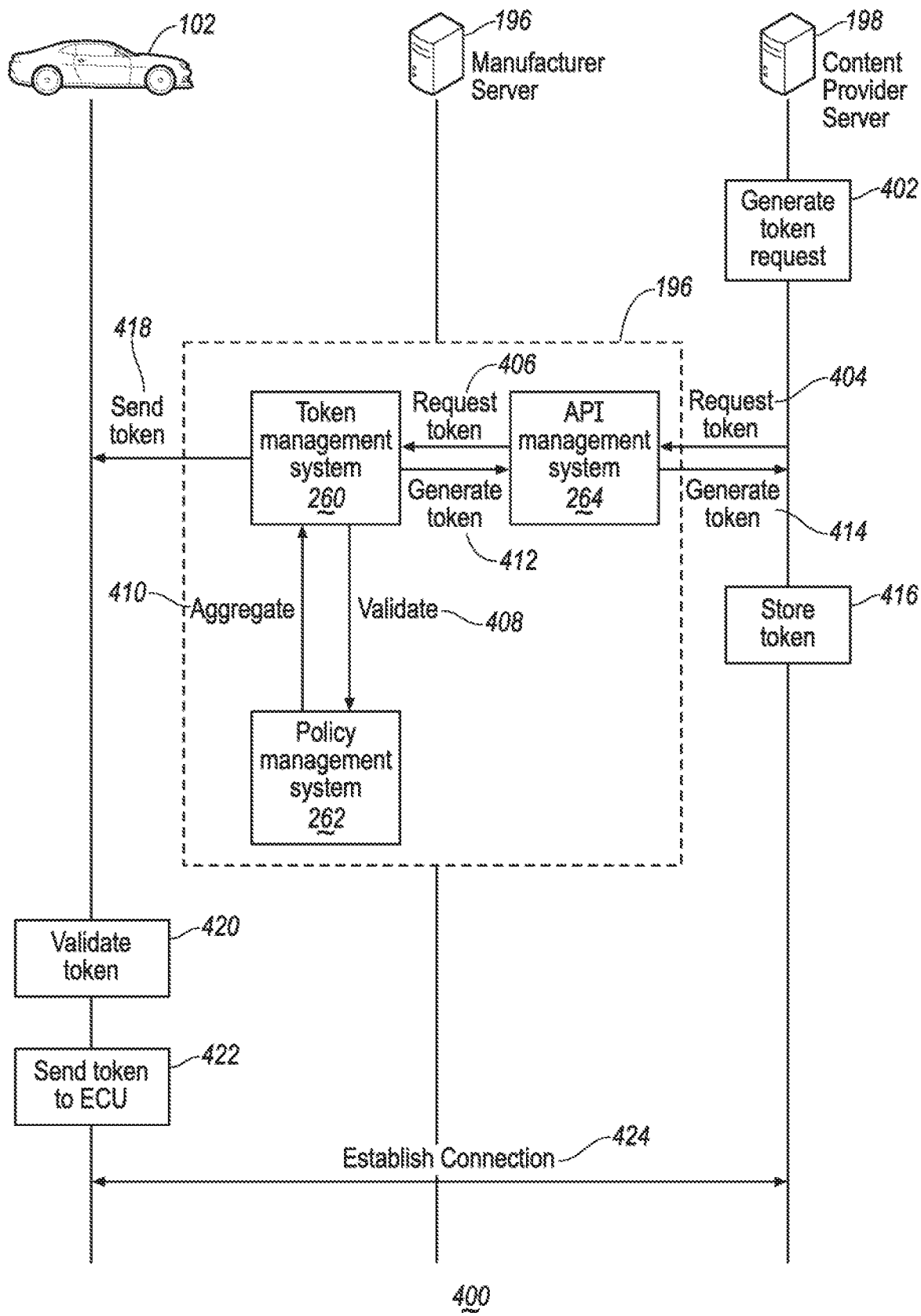
FIG. 4 illustrates an example data flow diagram for a process of a vehicle connection system of yet another embodiment of the present disclosure.

Referring to FIG. 4, a data flow diagram for a process 400 of a vehicle connection system of another embodiment of the present disclosure is illustrated. In the present example, the security token request is initiated from the content provider server 198. At operation 402, the content provider server 198 generates a token request responsive to detecting a trigger event e.g. a software update being available for a vehicle ECU 172. The content provider server 198 sends the token request to the token management system 260 via the API management system 264 of the manufacturer server 196 at operations 404 and 406. At operation 408, the token management system 260 validates the meta information contained in the token request. For instance, the meta information may include software version, identity of target ECU 172, data content type, identity of the content provider or the like. Responsive to a successful meta information validation, the policy management system 262 validates the token request against cloud policies including feature management, subscription management, customer connectivity settings, and/or various general or specific business rules to determine if the token request should proceed. Responsive to a successful cloud policy validation, the policy management system 262 aggregates the policy validation result to generate an aggregated cloud policy validation result for the token management system 260 at operation 410.

The token management system 260, generates a security token at operation 412 responsive to a successful cloud policy validation, and send the security token to the content provider server 192 via the API management system 264 at operation 414. At operation 416, the content provider server 198 stores the security token for validating content request from the vehicle 102. The token management system 260 further sends the security token to the vehicle 102 at operation 418. Responsive to receiving the security token, the computing platform 104 validates the security token and stores the security token with an expiration time stamp in the storage 106. At operation 422, the computing platform 104 sends the security token to the target ECU 172 specified in the token to allow the target ECU 172 to establish a connection with the content provider server 198.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system, comprising:
  one or more servers, programmed to
    responsive to receiving a first token request from a vehicle to access content stored in a content cloud, validate the first token request against pre-defined policies;
    responsive to a successful policy validation, verify token generating responsibility for the first token request based on a validation result and pre-defined rules; and
    responsive to verifying the system has the token generating responsibility for the first token request, generate a first token for the token request;
    send the first token to the content cloud; and
    responsive to receiving an acknowledgment from the content cloud confirming a successful content cloud validation using the first token, send the first token to the vehicle;
    responsive to receiving a second token request from the vehicle access a second content stored in the content cloud, verify token generating responsibility for the second token request, and
    responsive to verifying the content cloud has the token generating responsibility for the second token request, send the second token request to the content cloud.

2. The system of claim 1, wherein the one or more servers are further programmed to, responsive to receiving a second token from the content cloud, forward the second token to the vehicle.

3. The system of claim 1, wherein the one or more servers are further programmed to, responsive to a successful policy validation, aggregate the validation result to produce an aggregated validation result.

4. The system of claim 1, wherein the pre-defined policies include at least one of connected vehicle feature management, subscription management, customer connectivity settings, or feature implementation business rules.

5. The system of claim 1, wherein the one or more servers are further programmed to facilitate a connection between the vehicle and the content cloud as a proxy.

6. A vehicle, comprising:
  a controller, programmed to
    responsive to detecting a first token request from a first electronic control unit (ECU) requesting to access a first content in a cloud and a second token request from a second ECU requesting to access a second content in the cloud, validate meta information of the first token request and the second token request;
    responsive to a successful meta information validation, validate the first token request and the second token request against in-vehicle policies;
    responsive to a successful in-vehicle policy validation, send the first token request and the second token request to the cloud via a telematics control unit (TCU);
    responsive to receiving a first token corresponding to the first token request and a second token corresponding to the second token request from the cloud, validate the tokens and store an expiration time stamp of each token; and
    establish a connection to the cloud to access the first and second content,
    wherein the first token is generated by a manufacturer server, and the second token is generated by a content server being remote from the manufacturer server.

7. The vehicle of claim 6, wherein the controller is further programmed to establish a connection to the content server to access the content.

8. The vehicle of claim 7, wherein the controller is further programmed to establish a connection to the content server via the manufacturer server as a proxy.

9. The vehicle of claim 6, wherein the controller is further programmed to responsive to successfully validating the first token received from the cloud, send the token to the first ECU along with a web address to establish the connection.

10. A method for a server, comprising:
- responsive to receiving a first token request from a vehicle via a token manager to access a first content stored in a content server, validating the token request against pre-defined cloud policies via a policy manager;
- responsive to a successful cloud policy validation from the policy manager, verifying token generating responsibility based on a cloud policy validation result and pre-defined rules via the token manager;
- responsive to verifying the token generating responsibility belongs to the server, generating a first token corresponding to the first token request;
- sending the first token to the content server; and
- responsive to receiving an acknowledgment from the content server confirming a successful content cloud validation using the first token, send the first token to the vehicle.

11. The method of claim 10, wherein the pre-defined cloud policies include at least one of connected vehicle feature management, subscription management, customer connectivity settings, or feature implementation business rules.

12. The method of claim 10, further comprising:
- responsive to receiving a second token request from the vehicle access a second content stored in the content cloud, verify token generating responsibility for the second token request, and
- responsive to verifying the second token generating responsibility belongs to the content server, sending the second token request to the content server, and
- responsive to receiving a second token corresponding to the second token request from the content server, forwarding the second token to the vehicle via the token manager.

13. The method of claim 10, further comprising:
- serving as a proxy between the vehicle and the content server for content communication.

\* \* \* \* \*